W. ALDERSON.
WHEEL AND RESILIENT TIRE FOR ROAD VEHICLES.
APPLICATION FILED NOV. 29, 1920.

1,389,729.

Patented Sept. 6, 1921.

Witness:
Arthur Thompson

Inventor:
William Alderson

UNITED STATES PATENT OFFICE.

WILLIAM ALDERSON, OF KIMBERLEY, CAPE OF GOOD HOPE, SOUTH AFRICA.

WHEEL AND RESILIENT TIRE FOR ROAD-VEHICLES.

1,389,729.   Specification of Letters Patent.   Patented Sept. 6, 1921.

Application filed November 29, 1920. Serial No. 427,171.

*To all whom it may concern:*

Be it known that I, WILLIAM ALDERSON, a subject of the King of Great Britain, and resident of Kimberley, in the Province of the Cape of Good Hope, Union of South Africa, have invented certain new and useful Improvements in Wheels and Resilient Tires for Road-Vehicles, of which the following is a specification.

This invention relates to wheels and resilient tires for road vehicles. It is applicable to bicycles and other light vehicles as well as to motor cars and other comparatively heavy vehicles.

The objects of the invention are to construct an unpuncturable and readily detachable tire of the kind referred to, and to that end the invention is designed to obtain the requisite resiliency without the employment of a pneumatic or inflated tube.

The invention will be described in connection with the accompanying drawings wherein I illustrate the preferred form of the invention.

Figure 1:
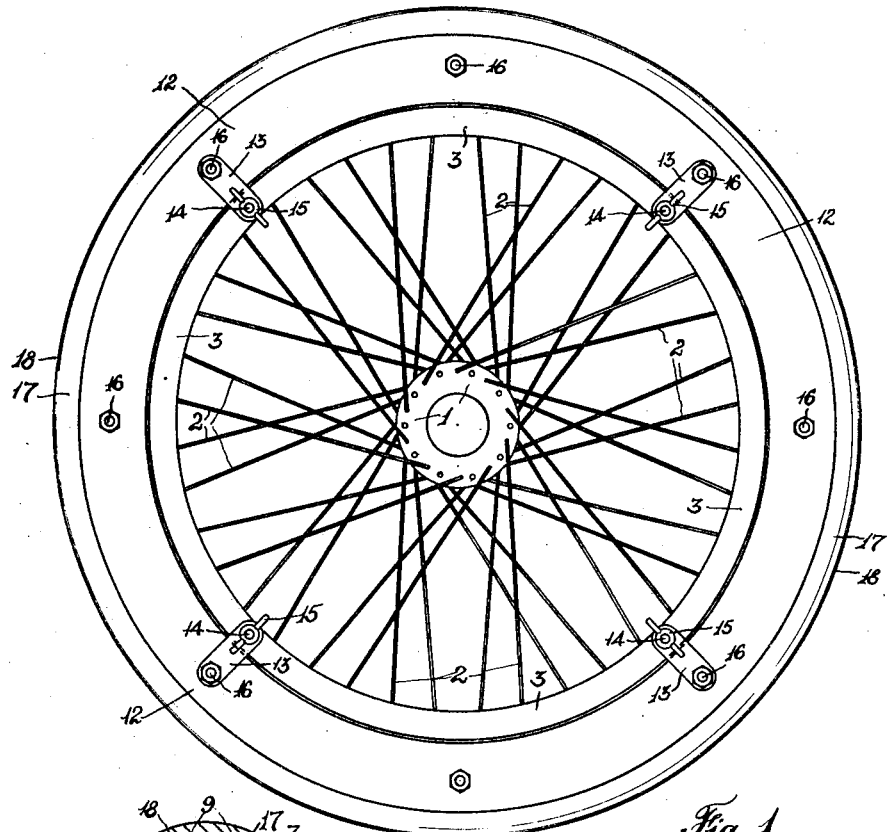
Figure 1, is a side elevation of a wheel fitted with the improved tire.
Figure 2:
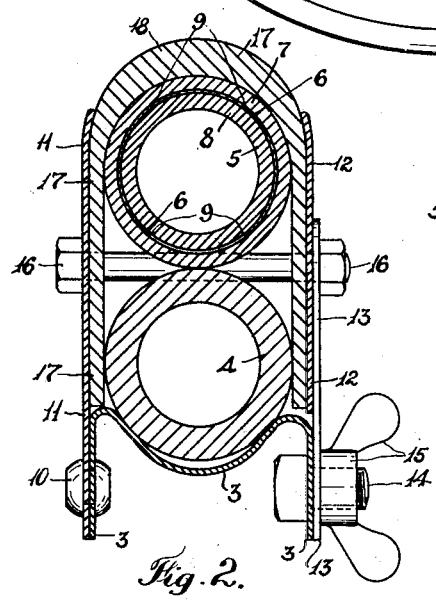
Fig. 2, is a cross section of the tire and rim of the wheel, drawn to an enlarged scale.

In Fig. 1, the numeral 1 denotes the hub of the wheel, 2 the spokes and 3 the rim portion, which may be of the sectional shape shown in Fig. 2, or any other preferred and suitable section.

Around the rim 3 there are arranged two resilient tubes, an inner endless tube 4 and an outer endless tube 5. The inner tube 4 is preferably made throughout of rubber, and is of a suitable thickness to suit the vehicle to which the tire is to be applied. This inner tube 4, as shown—see Fig. 2—preferably rests in the concavity of the rim 3. If desired this tube 4 may be reinforced with an appropriate number of plies of canvas or other suitable flexible material.

Figure 3:
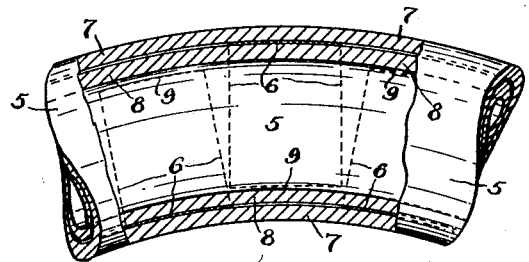
Fig. 3, is a part sectional view of a portion of the outer compound tube of the tire, the plane of section being taken at right angles to Fig. 2.

The outer tube 5, which is disposed concentrically around the inner tube 4 is a double or compound and reinforced tube; that is to say it consists of outer and inner tubes and an intermediate or medial reinforcing medium, which may be made of metal or other suitable, preferably relatively hard resilient material. The reinforcement may, as shown, be in the form of a suitable number of curved thin metal plates 6, positioned centrally between the inner and outer tubes or walls of rubber, so that the outer rubber tube or portion 7 is of the same thickness as the inner rubber tube or portion 8. The plates 6 are preferably staggered or so arranged relative to each other, that the gaps 9 formed between their ends are located in different positions or at different points in and around the annular space between the tubes or portions 7, 8. The curved plates 6—see Fig. 2—in section, are segments of a circle and they are made of the requisite thickness and length—see Fig. 3—to suit the vehicle to which the tire is to be applied.

To the rim 3, at the one side of the wheel there is riveted, as indicated at 10, or otherwise affixed a ring or annular piece 11, of metal or other suitable rigid material, which forms a flange around the rim at one side of the wheel. At the other side of the wheel rim there is placed a metal ring or annular piece 12, and a plurality of clamping plates 13, all of which may be made of metal or other suitable rigid material. The plates 13, which serve as a clamping means, are detachably secured to the rim 3 by the bolts 14 and wing-nuts 15; and the retaining ring 12 is detachably connected to said plates 13, on the inner side of the latter, and also to the ring 11, by a suitable number of retaining bolts 16. The rings 11, 12, and plates 13, form between them a housing, socket or annular peripheral space in which the tubes 4, 5, of the tire are arranged and retained.

It is preferred to employ a rubber or other suitable cover 17 for the tire, which cover is, as shown, preferably make thicker in the tread portion 18 than the sides. The sides of the cover project down the inner sides of the rings 11, 12, preferably to the sides of the rim 3. The retaining bolts 16 pass through holes in the side portions of the cover 17 and between the tubes 4, 5, and serve to keep the said parts in position in the socket or between the side flanges or rings 11, 12.

Although I show my invention embodied in a tire structure consisting of two tubes and a cover, it is to be understood that the cover may be dispensed with.

As will be understood the several parts of the tire, that is, in the case of the construction shown in the drawings, the two tubes 4, 5, and the cover 17, can be easily and quickly detached from the rim 3, by removing the wing-nuts 15 and nuts of the bolts 16, and then taking the ring 12, and plates 13, off the side of the wheel. The various parts can be assembled and secured in position around the rim 3 with equal facility.

What I claim as my invention and desire to protect by Letters Patent is:—

1. In a wheel and a resilient tire therefor, the combination with a rim portion of the wheel of a retaining ring fixed to one side of the rim, clamping means detachably connected to the rim at the other side of said wheel, a second retaining ring detachably secured to the clamping means and the first-mentioned retaining ring, an inner resilient tube placed around the rim and between said retaining rings, and an outer and concentric compound resilient tube embodying curved reinforcing medial plates, said plates being staggered or so disposed that the gaps formed between their ends are placed at different points within and around the compound resilient outer tube, as set forth.

2. In a wheel and a resilient tire therefor, the combination with the rim portion of the wheel of a retaining ring fixed to one side of the rim,—clamping plates detachably connected to the rim at the other side of said wheel, a second retaining ring detachably secured to the clamping plates and the first-mentioned retaining ring, an inner resilient tube placed around the rim and between said retaining rings, an outer and concentric compound resilient tube embodying curved reinforcing medial plates, said plates being staggered or so disposed that the gaps formed between their ends are placed at different points within and around the compound resilient outer tube, a cover which forms the tread of the tire and is placed around the said outer tube and extends down the inside of the retaining rings to the sides of the rim of the wheel, and bolts for securing the detachable retaining ring to the clamping plates and the fixed retaining ring, said bolts also serving for retaining the cover in position around the outer resilient tube and between said retaining rings, as set forth.

In testimony whereof I have signed my name to this specification in the presence of two subscribing witnesses.

WILLIAM ALDERSON.

Witnesses:
 LILIAN A. GINSBERG,
 ARTHUR THOMPSON.